United States Patent Office 3,825,575
Patented July 23, 1974

3,825,575
PERFLUOROALKYLALKYLMONOCARBOXYLIC
ACID ESTERS
Horst Jaeger, Bettingen, Switzerland, assignor to
Ciba-Geigy AG, Basel, Switzerland
No Drawing. Filed Feb. 3, 1971, Ser. No. 112,445
Claims priority, application Switzerland, Feb. 9, 1970,
1,825/70
Int. Cl. C07c 69/62; D06m 13/20
U.S. Cl. 260—408                                 11 Claims

ABSTRACT OF THE DISCLOSURE

Perfluoroalkylalkylmonocarboxylic acid esters are provided which are derived from acyclic aliphatic epoxides. These esters contain at least one perfluoroalkyl radical with 4 to 14 carbon atoms which is bonded over an alkylene group with 1 to 10 carbon atoms to a carboxyl group, which in turn is bonded in a ester-like manner to an acyclic radical. This radical contains in the 2-position to the ester bridge an optionally etherified or esterified hydroxyl group; said radical is bonded via an ester, ether or carbamate bridge to an alkenyl group with 2 to 3 carbon atoms which is optionally linked via a second ester, ether or carbamate bridge to an acyclic radical which in turn may be bonded via an ester bridge and an alkylene group to a perfluoroalkyl radical.

The perfluoroalkylalkylmonocarboxylic acid esters and also their homopolymers or their copolymers with other polymerisable products are used to achieve oleophobic furnishes on porous or non-porous substrates, especially on fibrous materials, such as textiles and papers.

---

The subject of the invention are perfluoroalkylalkylmonocarboxylic acid esters which contain (a) at least one perfluoroalkyl radical with 4 to 14 carbon atoms, which is bonded via an alkylene group with 1 to 10 carbon atoms to a carboxyl group, which is bonded in an ester-like manner to (b) an acyclic, aliphatic radical which is substituted in the 2-position to the ester bridge by an optionally etherified or esterified hydroxyl group, this radical being bonded, via an ester, ether or carbamate bridge, to (c) an alkenyl group with 2 to 3 carbon atoms, which is optionally linked via a second ester, ether or carbamate bridge to a radical like (b), which is in turn bonded via an ester bridge to a radical like (a). The alkylene group, via which the perfluoroalkyl radical is bonded to the carboxyl group, can be acyclic—branched or unbranched—or cyclic. The acyclic radicals contain 1 to 10 carbon atoms, whilst the cycloalkylene radicals possess 5 or 6 ring carbon atoms. The ethylene, n-butylene, n-decylene, isopropylene or cyclohexylene radical may be mentioned as examples.

Preferably, these perfluoroalkylalkylmonocarboxylic acid esters correspond to the formula (I)

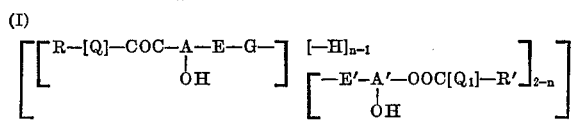

wherein R and R' each denote a perfluoroalkyl radical with 4 to 14 carbon atoms, Q and $Q_1$ each denote an acyclic alkylene radical with 1 to 10 carbon atoms or a cycloalkylene radical with 5 or 6 ring carbon atoms, A and A' each denote an alkylene radical which is optionally substituted further, E and E' each denote a radical of the formula —OOC—, —O— or —OOC—NY—, wherein Y represents a hydrogen atom or a lower alkyl radical, G denotes a radical of the formula

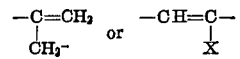

wherein X represents a hydrogen atom or a methyl radical, and n denotes 1 or 2, and the hydroxyl group is in the 2-position relative to the R—COO— or R'—COO— group.

Further suitable compounds are the perfluoroalkylalkylmonocarboxylic acid esters of the formula (II)

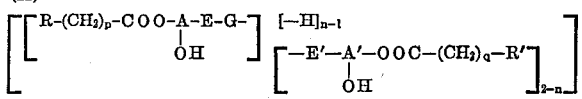

wherein the symbols R, R', A, A', E, E', G and n have the indicated meaning and p and q each denote an integer having a value of 1 to 10, preferably 2 to 6.

Thus, where n is 1, the compounds of the formula (I) are esters with two perfluoroalkylalkylmonocarboxylic acid radicals, and if n is 2, they are esters with only one perfluoroalkylalkylmonocarboxylic acid ester radical. The radical G can be bonded by its two free valencies, optionally to E or E' or to H, that is to say in the case of n=2 —E—G—H can represent the radical of, for example, methacrylic, acrylic or crotonic acid, and in the case of n=1, —E—G—E'— can represent the radical of for example maleic, itaconic or citraconic acid. However, perfluoroalkylalkylmonocarboxylic acid esters with only one perfluoroalkyl radical are preferred, that is to say compounds of the formula (III)           R—(CH$_2$)$_p$—COO—A—E—G—H
                                    |
                                    OH wherein R, A, E, G and p have the indicated meaning, and the hydroxyl group is in the 2-position to the R—COO— group.

Compounds of particular interest are perfluoroalkylalkylmonocarboxylic acid esters of the formula (IV)

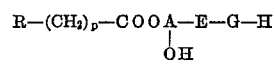

wherein R, E, G and p have the indicated meaning, $A_1$ denotes a hydrogen atom or an alkyl radical, $A_2$ denotes an alkyl radical and m denotes 1 or 2.

A preferred position is then occupied by perfluoroalkylalkylmonocarboxylic acid esters of the formula (V)            R—(CH$_2$)$_p$—COO—A—E—C—CH$_2$
                                    |    |
                                    OH   X and especially of the formula (VI)

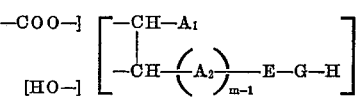

wherein R, A, $A_1$, $A_2$, E, X, p and m have the indicated meaning, and the hydroxyl group is in the 2-position to the R—COO— group.

Advantageous properties are above all also shown by perfluoroalkylalkylmonocarboxylic acid esters of the formula (VII)

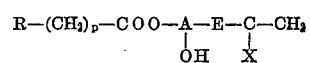

wherein R, G, p and m have the indicated meaning, and $A_3$ denotes a hydrogen atom, an alkyl radical with 1 to 8 carbon atoms and $A_4$ denotes an alkylene radical with 1 to 8 carbon atoms.

Perfluoroalkylalkylmonocarboxylic acid esters of the formula (VIII)

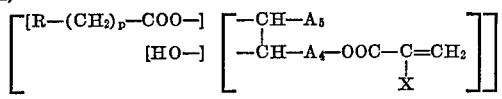

wherein R, $A_4$, X and $p$ have the indicated meaning and $A_5$ represents a hydrogen atom or a methyl or ethyl group, are particularly suitable.

Good results are further also achieved with perfluoroalkylalkylmonocarboxylic acid esters of the formula (IX)

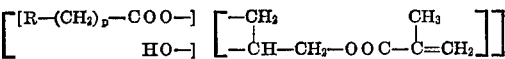

wherein R and $p$ have the indicated meaning.

The perfluoroalkyl radical of the perfluoroalkylalkylmonocarboxylic acid ester according to the invention preferably contains 5 to 11, or especially 7 to 9, carbon atoms. The perfluoroalkyl radical can be either branched or unbranched. A branched radical can, for example, be an iso-perfluoroalkyl radical of the formula (X)

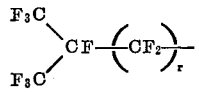

wherein $r$ represents an integer having a value of 1 to 11. However, n-perfluoroalkyl radicals are preferred. A further possibility as a perfluoroalkyl radical is also a so-called ω-H-perfluoroalkyl radical, which possesses a hydrogen atom in the terminal position.

The perfluoroalkylalkylmonocarboxylic acid esters according to the invention are mostly isomer mixtures, in that, on opening the epoxide ring, the esterification with the perfluoroalkylalkylmonocarboxylic acid can take place at either of the adjacent carbon atoms of the epoxide group.

A preferred position is here therefore also occupied by a perfluoroalkylalkylmonocarboxylic acid ester of the formula (XIa)

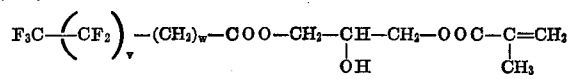

or (XIb)

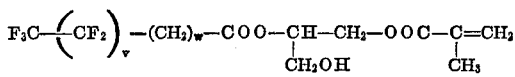

wherein $v$ denotes the integers 5, 7 and 9, and $w$ denotes the integers 2 and 4.

The perfluoroalkylalkylmonocarboxylic acid esters according to the invention are manufactured according to methods which are in themselves known, by reacting (1) a perfluoroalkylalkylmonocarboxylic acid, which contains a perfluoroalkyl radical with 4 to 14 carbon atoms, which is bonded via an alkylene bridge with 1 to 10 carbon atoms or a cycloalkylene bridge with 5 or 6 ring carbon atoms to the carboxyl group, with (2) an acyclic, aliphatic epoxide, which is bonded via an ester, ether or carbamate bridge to an alkenyl group with 2 to 3 carbon atoms, which is optionally linked via a second ester, ether or carbamate bridge to an acyclic, aliphatic epoxide, and optionally further carrying out an etherification or esterification with an aliphatic compound.

Perfluoroalkylalkylmonocarboxylic acid esters of the formulae (I) and (II) are obtained by the reaction of the component (1) with (2), an epoxide of the formula (XII)

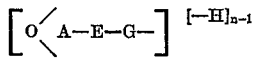

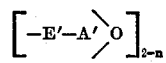

wherein A, A', E, E', G and $n$ have the indicated meaning.

Perfluoroalkylalkylmonocarboxylic acid esters of the Formula (III) are obtained if an epoxide of the formula (XIII)    $O<A-E-G-H$ wherein A, E and G have the indicated meaning, is used as component (2).

The particularly interesting compounds of the formula (IV) are obtained if an epoxide of the formula (XIV)

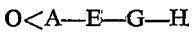

wherein $A_1$, $A_2$, E, G and $m$ have the indicated meaning, is used as component (2).

If an epoxide of the formula (XV)

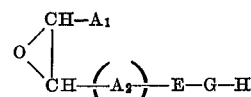

or (XVI)

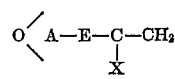

wherein A, $A_1$, $A_2$, $E_1$ and $m$ have the indicated meaning, is used as component (2), the preferred perfluoroalkylalkylcarboxylic acid ester of the formula (V) or (VI) are obtained.

To manufacture compounds of the formula (VII) or (VIII), epoxides of the formula (XVII)

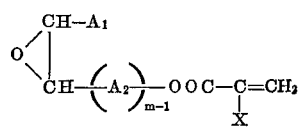

or (XVIII)

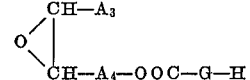

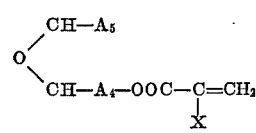

wherein $A_3$, $A_4$, $A_5$, G and X have the indicated meaning, are employed as component (2).

Glycidyl methacrylate has proved a particularly advantageous component (2). Instead of the epoxides, the corresponding diols can also be used for the manufacture of the compounds according to the invention.

The perfluoroalkylalkylmonocarboxylic acids employed as component (1) preferably contain 5 to 11, or especially 7 to 9, carbon atoms in the perfluoroalkyl radical.

The perfluoroalkyl radical is preferably bonded to the carboxyl group via an alkylene bridge member with 2 to 6 carbon atoms.

The reaction to manufacture the perfluoroalkylalkylmonocarboxylic acid esters according to the invention is appropriately carried out in an organic solvent, for example ethyl acetate. As a rule, the reaction is also carried out in the presence of a catalyst, for example anhydrous sodium acetate. Preferably, the reaction is carried out at a temperature of 20 to 70° C. and especially 40 to 60° C. Depending on the reaction temperature and the reactivity of the components (1) and (2) employed, the reaction takes 1 to 24, or especially 4 to 8, hours. The reaction mixtures optionally also contain stabilisers for the alkenyl group with 2 to 3 carbon atoms, such as, for example, hydroquinonemonomethyl-ether.

The acyclic, aliphatic radical which is bonded to the perfluoroalkylalkylmonocarboxylic acid and to the alkenyl group with 2 to 3 carbon atoms, that is to say the radical A in the formulae (I) and (II), is for example derived from an epoxyalkanol, such as 2-epoxypropanol-1, or from an epoxyhalogenoalkane, such as epichlorohydrin. Both types of compound can be easily manufactured from olefines, for example allyl alcohol or allyl chloride, by epoxidation.

Further possible epoxyalkanols are, for example: 9-epoxyoctadecanol-1, 1-epoxyoctanol-3, 1-epoxyoctanol-4, 1 - epoxy - 4 - methylhexanol - 4, 2 - epoxy - 5 - methylheptanol-5, 1 - epoxy - 5 - methylpentanol - 4, 4 - epoxypentanol-1, 3-epoxypentanol-1 and 1-epoxypentanol-4.

The olefinic groups can for example by introduced by means of the following compounds: acrylic acid, methacrylic acid, crotonic acid, maleic acid, fumaric acid, itaconic acid, citraconic acid, acrylamide, methacrylamide, vinyl chloride and allyl isocyanate.

Another process of arriving at the perfluoroalkylalkylmonocarboxylic acid esters in question consist of esterifying (1) a perfluoroalkylalkylmonocarboxylic acid or its acid halide with (2) a hydroxyalkyl-vinyl compound, (3) epoxidising the vinyl group and subsequently (4) esterifying the product, for example with an ethylenically unsaturated carboxylic acid.

Further, it is also possible to obtain the perfluoroalkylalkylmonocarboxylic acid esters according to the invention if (1) a perfluoroalkylalkylcarboxylic acid is first esterified with (2) a hydroxyhalogenohydrin, (3) the product is converted into the epoxide, hydrogen halide being split off, and thereafter (4) the epoxide is esterified with, for example, an ethylenically unsaturated carboxylic acid.

The corresponding ethers or amides are manufactured analogously in accordance with the latter two methods.

If one of these latter two processes is used, wherein the perfluoroalkylalkylmonocarboxylic acid is first reacted with an acyclic aliphatic compound and only subsequently etherified or esterified, it is also possible to obtain products which are additionally further esterified or etherified at the hydroxyl group which is in the position adjacent to the perfluoroalkylalkylcarboxylic acid ester group.

The perfluoroalkylmonocarboxylic acid esters according to the invention can, by virtue of their vinyl group, be homopolymerised, or copolymerised with other ethylenically unsaturated copolymerisable compounds.

The polymerisation of the monomeric perfluoroalkylalkylmonocarboxylic acid esters can take place in solution or in emulsion, and in the presence of catalysts which release free radicals or act by an ionic mechanism, the ester being polymerised by itself, with another perfluoroalkylalkylmonocarboxylic acid ester according to the invention, or with other polymerisable compounds to give linear polymers.

The following are suitable for copolymerisation with the perfluoroalkylalkylmonocarboxylic acid esters:

(a) Vinyl esters of organic carboxylic acids, for example vinyl acetate, vinyl formate, vinyl butyrate or vinyl benzoate,
(b) vinyl alkyl ketones and vinyl alkyl ethers, such as vinyl methyl ketone and vinyl butyl ether,
(c) vinyl halides, such as vinyl chloride, vinyl fluoride or vinylidene chloride,
(d) vinyl aryl compounds, such as styrene and substituted styrenes,
(e) derivatives of the acrylic acid series, such as acrylonitrile or acrylamide and, preferably, its derivatives which are substituted at the amide nitrogen, such as N-methylolacrylamide, N-methylolacrylamide-alkyl-ether, N,N - dihydroxyethylacrylamide, N - tert.-butyl - acrylamide and hexamethylolmelaminetriacrylamide,
(f) esters of the acrylic acid series, such as esters of acrylic acid, methacrylic acid, α-chloroacrylic acid, crotonic acid, maleic acid, fumaric acid or itaconic acid, and monoalcohols or dialcohols with 1 to 18 carbon atoms or phenols, for example ethyl acrylate, glycidyl acrylate, butyl acrylate, acrylic acid monoglycol ester or dodecyl acrylate, and
(g) polymerisable olefines, such as isobutylene, butadiene or 2-chlorobutadiene,
(h) polymers, such as for example polyolefines, onto which the monomeric compounds are grafted and polymerised (graft copolymers).

Preferably used compounds are esters, amides or methylolamides of acrylic acid or methacrylic acid, such as acrylic acid ethyl ester, acrylic acid butyl ester, acrylic acid glycidyl ester, glycol monoacrylate, and also calcium acrylate, acrylamide, methylmethacrylate, acrylamide, methacrylamide, N-methylolacrylamide, N-methylolacrylamide-methyl-ether and N-tert. butyl-acrylamide; vinyl esters of organic carboxylic acids, such as vinyl acetate; styrene, vinyl halides, such as vinyl chloride or vinylidene chloride, or polymerisable olefines, such as isobutylene.

The polymers as a rule consist of 5 to 100 percent by weight of a perfluoroalkylalkylmonocarboxylic acid ester and of 95 to 0 percent by weight of another compound. Particularly interesting technical properties are shown by those polymers which contain 5 to 30, preferably 8 to 20, percent by weight of the monomeric perfluoroalkylalkylmonocarboxylic acid ester, calculated relative to the total weight of the monomer unit, in a copolymerised form. Amongst these polymers, the binary or ternary copolymers which in addition to 5 to 30 percent by weight of the perfluoroalkylalkylmonocarboxylic acid ester also contain an acrylic acid ester, such as butyl acetate, and optionally a third monomer, especially a vinyl ester, such as vinyl acetate, in a copolymerised form, are in turn distinguished by specially advantageous technical properties, particularly in the field of textile finishing.

The manufacture of the polymers by homopolymerisation or copolymerisation of perfluoroalkylalkylmonocarboxylic acid esters with one or more other copolymerisable ethylenically unsaturated monomers is carried out according to customary methods, for example by block polymerisation, bead polymerisation, polymerisation in aqueous emulsion or preferably by solvent polymerisation in an organic solvent which is suitable for this purpose, such as, for example, acetone, benzene, sym.-dichloroethane or ethyl acetate.

The polymerisation is appropriately carried out with warming, preferably to the boiling point of the solvent, and with the addition of catalysts which act by an ionic mechanism or of peroxidic or other catalysts which yield free radicals and are soluble in the reaction medium, such as for example benzoyl peroxide, lauroyl peroxide or α,α'-azoisobutyrodinitrile.

Depending on the nature of the polymerisation conditions and of the monomeric starting substances used, the polymeric compounds are obtained in the form of viscous solutions, of granules or in the form of emulsions.

It is furthermore also possible to carry out the polymerisation of the monomeric compounds in the presence of substrates. It can for example be carried out on glass-fibre fabrics or on textile material. In this case, the substrate in question is appropriately impregnated with solutions or emulsions of the monomers, and thereafter the polymerisation is carried out by heating the material, a polymerisation catalyst being added.

Because of the presence of free hydroxyl groups, the monomeric perfluoroalkylalkylmonocarboxylic acid esters and their polymers react with compounds which contain several functional groups capable of reaction with hydroxyl groups, such as 1,2-epoxide groups, isocyanate groups, acrylyl groups, methylol groups, methylol groups etherified with lower alcohols, aldehyde groups or easily hydrolysable ester groups, and the like. Such polyfunctional compounds are therefore suitable for use as cross-linking components or curing components for the copolymers, containing hydroxyl groups, according to the invention.

As such crosslinking components there may especially be mentioned: epoxide compounds, namely polyglycidyl ethers such as butanediol diglycidyl ether and diglycidyl ether, diisocyanates and polyisocyanates, such as o-, m- and p-phenylenediisocyanate, toluylene-2,4-diisocyanate and 1,5-naphthylenediisocyanate; acrylyl compounds, such as methylene-bis-acrylamide and symmetrical triacrylylperhydrotriazine; poly(2,3 - dihydro-1,4-pyranyl) compounds, such as (2,3-dihydro-1',4'-pyran-2'-yl)-methyl ester; aldehydes, such as formaldehyde or glyoxal, and soluble phenol-formaldehyde condensation products, such as novolacs or resols. Aminoplasts which are soluble in water or in organic solvents are preferentially used as crosslinking components. Possible aminoplasts are formaldehyde condensation products of urea, thiourea, guanidine, acetylenediurea and dicyandiamide, and also of aminotriazines such as melamine or of guanamines, such as acetoguanamine, benzoguanamine, tetrahydrobenzoguanamine or formoguanamine as well as their ethers with alcohols, such as methyl, ethyl, propyl, allyl, butyl, amyl and hexyl alcohol, cyclohexanol, benzyl alcohol, lauryl alcohol, and stearyl, oleyl or abietyl alcohol. In addition to the ether radicals, the condensation products can also additionally contain radicals of higher-molecular acids, such as, for example, stearic acid.

Particularly good technical results in the field of textile finishing are obtained on using water-soluble condensation products of formaldehyde and melamine or especially the esterification product or etherification product of hexamethylolmelamine-methyl-ether and stearic acid or stearyl alcohol, as crosslinking components.

The homopolymers and copolymers of the perfluoroalkylalkylmonocarboxylic acid esters can also be used as a mixture with polymers not containing fluorine (so-called extenders). Very suitable polymers not containing fluorine are here, for example, the homopolymers of acrylic acid esters or methacrylic acid esters, such as poly (ethyl acrylate) or copolymers of acrylic acid esters or methacrylic acid esters with methylol acrylamide or methylolmethacrylamide.

The perfluoroalkylalkylmonocarboxylic acid esters according to the invention can be used either as such, or as homopolymers or copolymers, for the treatment of porous or non-porous substrates, and preferably for the production of oleophobic finishes on these. Leather, or especially fibre materials, such as textiles and paper, may be mentioned as porous substrates. Metal and especially glass are above all relevant non-porous substrates.

Simultaneously with the action of imparting an oleophobic effect, these perfluoro compounds also show hydrophilic properties. For imparting an oleophobic effect, the substrates can be treated either with solutions or dispersions or emulsions of the monomeric or polymeric perfluoro compounds. The monomers can for example be applied to the textile material from a solution in an organic solvent, and be fixed thermally to the fabric after evaporation of the solvent. Polymers can also be applied to the fabrics from suitable solvents.

Possible textile materials which are preferably treated with the monomeric or polymeric perfluoro compounds are for example those of natural or regenerated cellulose, such as cotton, linen or rayon, viscose staple or cellulose acetate. However, textiles of wool, synthetic polyamides, polyesters or polyacrylonitrile can also be treated. Mixed woven fabrics or mixed knitted fabrics of cotton-polyester fibres can also advantageously be finished. The textiles can in these cases be in the form of filaments, fibres or flocks, but preferably of woven fabrics or knitted fabrics.

Preparations which contain the monomeric or polymeric perfluoro compounds can be applied to the substrate in the usual manner which is in itself known. Woven fabrics can for example be impregnated by the exhaustion process or on a padder which is charged with the preparation at room temperature. The impregnated material is thereafter dried at 60 to 120° C. and subsequently optionally still subjected to a heat treatment at above 100° C., for example at 120 to 200° C.

Preparations which in addition to the perfluoro compounds according to the invention also contain components with hydrophobic properties, for example solutions or emulsions of fatty acid condensation products, for example with aminoplast precondensates, or paraffin emulsions, produce an oil-repellent effect on the substrates treated therewith, coupled with a water-repellent effect.

Further, a so-called "soil release" and "anti-soiling" effect can also be achieved with the perfluoro compounds according to the invention, especially on cotton.

Example 1

7.15 g. of glycidyl methacrylate and 22.1 g. of 2,2,3,3-H-pentadecafluorodecylic acid, with the addition of 1.0 g. of anhydrous sodium acetate and 0.2 g. of hydroquinone-monomethylether, are dissolved in 100 ml. of ethyl acetate at room temperature. The temperature rises to 29.5° C. The reaction temperature is kept constant at 30° C. and after 18 hours' reaction the epoxide content is 0%. The solution is concentrated in vacuo at 30° C. The residue is taken up in 100 ml. of diethyl ether and washed 3 times with 20 ml. of water, and yields a clear, viscous phase. Weight, 23.7 g.=55.25% of theory.

The structure is confirmed by recording a mass spectrum, in that this shows a molecular weight of 584, which corresponds to a product of the formula (101)

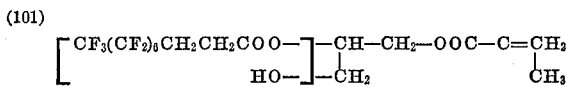

Example 2

2 g. of the end product according to Example 1 are dissolved in 10 ml. of ethyl acetate. 0.1 g. of potassium persulphate was additionally added to this solution, and the mixture was heated to 70° C., for 10 minutes, whilst stirring. The resulting polymer has a solids content of 19.52%.

Example 3

28.4 g. of glycidyl methacrylate together with 100 g. of perfluoroalkylalkylcarboxylic acid [1][2] and 1 g. of sodium acetate (anhydrous) and 0.5 g. of hydroquinone-mono-methyl-ether as a stabiliser, are dissolved in 300 ml. of ethyl acetate. After 4 hours' reaction at 80° C., the ethyl acetate is removed in vacuo, the residue is taken up in diethyl ether, the solution is eluted 3 times with 20 ml. of water and dried with sodium sulphate, and the diethyl ether is removed in vacuo.

66.7 g. of a light brown, waxy substance are obtained, corresponding to a yield of 52.6%.

The structure is confirmed by recording a mass spectrum, in that this shows molecular weights of 634, 662 and 734, which corresponds to a structure of the formula

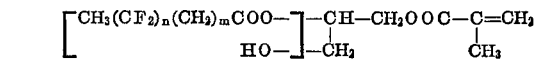

$n=5, 7, 9; m=2, 4$

---

[1] The perfluoroalkylalkylcarboxylic acid used has the following composition according to the gas chromatogram and mass spectrum:
  32% of $C_9F_{17}C_2H_4COOH$ _____ M 492
  28% of $C_{10}F_{21}C_2H_4COOH$ _____ M 592
  10% of $C_{12}F_{25}C_2H_4COOH$ _____ M 692
  20% of $C_8F_{17}C_4H_8COOH$ _____ M 520
  8% of $C_{10}F_{21}C_4H_8COOH$ _____ M 620

[2] In a repeat of the above example, a perfluoroalkylalkylcarboxylic acid of the following composition was used. The yield was 91.3% of theory.
  19% of $C_8F_{17}C_2H_4COOH$ _____ M 492
  40.5% of $C_{10}F_{21}C_2H_4COOH$ _____ M 592
  20% of $C_8F_{17}C_4H_8COOH$ _____ M 520
  15% of $C_{10}F_{21}C_4H_8COOH$ _____ M 620

Example 4

20 g. of perfluoroalkylalkylcarboxylic acid glycerine monoester (manufactured from perfluoroalkylalkylcarboxylic acid [3] and glycerine-glycid) are dissolved in 50 ml. of absolute diethyl ether with the addition of 0.1 g. of ionol. 2.5 g. of allyl isocyanate are added dropwise to this solution. The reaction mixture is kept at the reflux temperature for 2 hours. It is then twice washed with 20 ml. of water and dried, and the diethyl ether is removed in vacuo.

Yield: 18.5 g. of a light brown product=81.3% of theory.

The structure is confirmed by recording a mass spectrum, in that this shows molecular weights of 749, 677 and 777, which corresponds to a structure of the formula

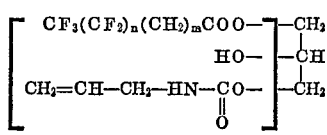

$n = 5, 7, 9, 11$
$m = 2, 4, 6$

Example 5

20 g. of perfluoroalkylalkylcarboxylic acid glycerine monoester (manufactured from perfluoroalkylalkylcarboxylic acid [4] and glycerine-glycid) and 0.1 g. of hydroquinone monomethyl ether are dissolved in 50 ml. of ethyl acetate. 2.6 g. of fumaric acid chloride dissolved in 20 ml. of ethyl acetate are added dropwise. The reaction is maintained at 50° C. overnight, the ethyl acetate is removed in vacuo, the residue is taken up in diethyl ether, the solution is washed with bicarbonate until neutral, and dried, and the ether is removed in vacuo. Yield: 15.8 g.=74.2% of a light brown product.

The structure of the compound according to the formula

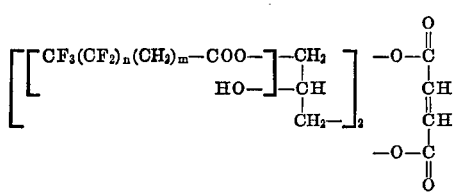

$n = 5, 7, 9, 11$
$m = 2, 4, 6$ is confirmed by recording a mass spectrum.

Example 6

14.2 g. of diglycidyl methacrylate together with 60.4 g. of a perfluoroalkylundecylic acid [5] and 2 g. of anhydrous sodium acetate are dissolved in 400 ml. of ethyl acetate, and the reaction is carried out as described in Example 3. The yield is 44.7 g. 59.92%

---

[3] The perfluoroalkylalkylcarboxylic acid used has the following composition according to the gas chromatogram and mass spectrum:

| | | |
|---|---|---|
| 16% of $CF_3(CF_2)_9C_2H_4COOH$ | | M 592 |
| 3% of $CF_3(CF_2)_{11}C_2H_4COOH$ | | M 692 |
| 2% of $CF_3(CF_2)_5C_4H_8COOH$ | | M 420 |
| 32% of $CF_3(CF_2)_7C_4H_8COOH$ | | M 520 |
| 34% of $CF_3(CF_2)_9C_4H_8COOH$ | | M 620 |
| 1% of $CF_3(CF_2)_5C_6H_{12}COOH$ | | M 448 |
| 11% of $CF_3(CF_2)_7C_6H_{12}COOH$ | | M 548 |

[4] The perfluoroalkylalkylcarboxylic acid used for the preparation has the same composition as in Example 4.

[5] The following perfluoroalkylundecylic acid was used for the preparation of the ester.

| | | Percent |
|---|---|---|
| M-504 | $CF_3(CF_2)_5(CH_2)_{10}COOH$ | 26.1 |
| M 604 | $CF_3(CF_2)_7(CH_2)_{10}COOH$ | 48.4 |
| M 704 | $CF_3(CF_2)_9(CH_2)_{10}COOH$ | 22.7 | of theory. A waxy substance is obtained. Recording a mass spectrum shows molecular weights of 646, 746 and 846 and confirms the following structure:

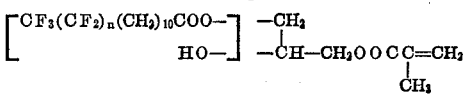

$n = 5, 7, 9$

Example 7

14.2 g. of glycidyl methacrylate, 60.4 g. of a perfluoroalkylcyclohexylcarboxylic acid [6] and 2.0 g. of anhydrous sodium acetate are dissolved in 400 ml. of ethyl acetate, and the reaction is carried out as described in Example 3.

The yield is 39.7 g. ≅ 53.22% of theory.

Recording a mass spectrum shows molecular weights of 588, 688 and 788 and permits confirmation of the following structure of the compounds:

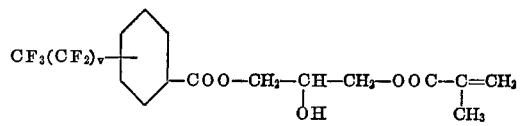

$v = 5, 7, 9$

Example 8

A solution of 1.6 parts of N-methylolmethacrylamide methyl ether and 38.4 parts of the compound from Example 3, in 60 parts of acetone, is heated to the boil whilst stirring and passing nitrogen over the mixture. The solution is treated 7 times, at intervals of 2 hours, with a solution of, in each case, 0.4 part of azodiisobutyronitrile in 4 parts of acetone. Polymerisation is allowed to go to completion over a further 10 hours at the reflux temperature, and about 132 parts of a 31% strength solution are obtained, corresponding to a polymer yield of 95%.

Example 9

A solution of 2 parts of polybutadiene, 0.6 part of styrene, 0.6 part of vinyl acetate, 0.6 part of benzoyl peroxide, 0.6 part of lauroyl peroxide and 10 parts of the compound from Example 5, in 30 parts of toluene, is warmed to 75° C. whilst stirring and passing nitrogen over the mixture, and is kept for 4 hours at 75° C. and 8 hours at 80° C. After distilling off the solvent in vacuo, a 30% strength solution of the polymer in benzotrifluoride is prepared.

Example 10

Woven pieces of cotton, cotton-polyester, synthetic polyamide, polyester and wool gaberdine are successively dipped into the polymer solution manufactured according to Example 2, and thus impregnated with the perfluoro compound.

---

[6] The following perfluoroalkylcyclohexylcarboxylic acid was used for the preparation of the ester:

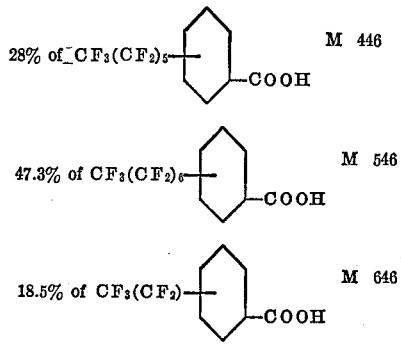

A piece of filter paper is also impregnated in this way, and a piece of glass is also coated. The samples of fabric, glass and paper are thereafter dried for 10 minutes at 140° C.

The assessment of the oil-repellent effect is carried out according to the so-called "3 M oil repellency test" (Crajeck and Petersen, Textile Research Journal 32, 320–331 [1960]), using heptane-Nujol mixtures. In the assesment, 150 denotes the best achievable rating. The individual samples are assessed immediately after drying, that is to say as obtained, after an SNV-4 wash (=machine wash for 30 minutes at 95° C., at a liquor ratio of 1:50, in a bath which per litre contains 5 g. of soap and 2 g. of calcined sodium carbonate and a total of 10 steel balls) and after a wash for 5 minutes in boiling trichloroethylene. The results are summarised in the table below.

| Substrate | Rating As obtained | After 1× trichloro-ethylene | After 1× SNV-4 |
|---|---|---|---|
| Cotton | 110 | 80 | 90 |
| Cotton/polyester | 100 | 100 | 90 |
| Polyester | 90 | 80 | 90 |
| Polyamide | 110 | 100 | 90 |
| Wool gaberdine | 80 | 70 | 70 |
| Paper | 120 | | |
| Glass | 140 | | |

Example 11

The following liquors are prepared from the products of Examples 3 to 9:

| Constituents | Liquor A | B | C | D | E | F |
|---|---|---|---|---|---|---|
| Product from— | | | | | | |
| Example 8 | 20 | 40 | 50 | | | |
| Example 3 | | | | 7.5 | | |
| Example 4 | | | | | | 30 |
| Example 9 | 30 | | 10 | | | |
| Poly(octylmethacrylate) | | 30 | | | | |
| (*) | | | | | 40 | |
| Example 6 | | | | | | 40 |
| Example 7 | | | | | | |
| Chloroacetic acid | 3 | 3 | 3 | | | |
| Water | | | | | | |
| Ethanol | | | | | | |
| Dioxane | | | | | | |
| Acetone/butanol, 1:4 | 1,000 | | 1,000 | | 1,000 | 100 |
| Chloroform | | 1,000 | | | | |

*=Hexamethylolmelamine-pentamethyl-ether.

NOTE.—Concentrations in g./l.

Woven pieces of cotton and, in part, cotton-polyester, are successively dipped into these liquors and thus impregnated with the perfluoro compound. Thereafter, the pieces of fabric are dried for 5 minutes at 140° C. in vacuo.

The oil-repellent effect is assessed in the same way as indicated in Example 10. The test is in each case carried out after 1, 5 and 10 SNV-3 washes.

(SNV-3 wash: machine wash for 30 minutes at 60° C., at a liquor ratio of 1:50, in a washing liquor which per litre contains 5 g. of soap and 2 g. of anhydrous sodium carbonate.)

The cotton-polyester fabric which has been finished with the liquor D, is additionally also tested for its soil release properties. For this purpose, the test specimen is spotted wih synthetic skin grease (Spangler, Cross and Sohaafma, J. Am. Oil. Soc. 42, 723 (1965)), and Nujol. The spots are applied before the first SNV-3 wash, and are assessed, after washing, with ratings from 1 to 5. The rating 1 denotes "not washed out" and the rating 5 denotes "completely washed out." For the soil release test, rating 5 is the best rating.

| | A | B | C | D | E | F |
|---|---|---|---|---|---|---|
| Cotton, as obtained | 60 | 80 | 110 | 120 | 90 | 70 |
| 1× SNV-3 | | 70 | | 120 | 70 | 60 |
| 5× SNV-3 | | | 100 | 100 | | |
| 10× SNV-3 | | | | 70 | | |
| Cotton/polyester, as obtained | 60 | 80 | 100 | 110 | 80 | 60 |
| 1× SNV-3 | | 80 | | 100 | 70 | |
| 5× SNV-3 | | | 100 | 90 | | |
| 10× SNV-3 | | | | | | |
| Soil release: | | | | | | |
| Nujol: 1× SNV-3 | | | | 3.5 | | |
| Skin grease: 1× SNV-3 | | | | 2.5 | | |

I claim:

1. Perfluoroalkylalkylmonocarboxylic acid esters characterised in that they correspond to the formula

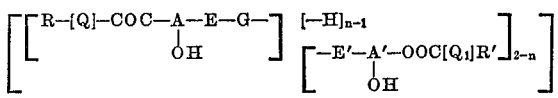

wherein R and R' each denote a perfluoroalkyl radical with 4 to 14 carbon atoms, Q and $Q_1$ each denote an acyclic alkylene radical with 1 to 10 carbon atoms or a cycloalkylene radical with 5 or 6 ring carbon atoms, A and A' each denote an alkylene radical with 2 to 18 carbon atoms, E and E' each denote a radical of the formula —OOC—, —O— or —OOC—NY—, wherein Y represents a hydrogen atom or a lower alkyl radical, G denotes a radical of the formula

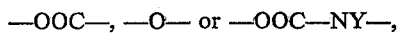

wherein X represents a hydrogen atom or a methyl radical, and $n$ denotes 1 or 2, and the hydroxyl group is in the 2-position relative to the R—COO— or R'—COO— group.

2. Prefluoroalkylalkylmonocarboxylic acid esters according to Claim 1, characterised in that they correspond to the formula

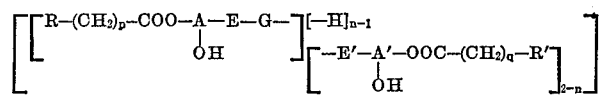

wherein R, R', A, A', Y, Y', E, E', G and $n$ have the meaning indicated in Claim 2, and $p$ and $q$ each denote an integer having a value of 1 to 10.

3. Perfluoroalkylalkylmonocarboxylic acid esters according to Claim 2, characterised in that $p$ and $q$ are each integers having a value of 2 to 6.

4. Perfluoroalkylalkylmonocarboxylic acid esters according to Claim 2, characterised in that they correspond to the formula

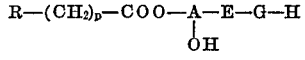

wherein R, A, E, G and $p$ have the meaning indicated in Claim 3, and the hydroxyl group is in the 2-position relative to the R—$(CH_2)_p$—COO—.

5. Perfluoroalkylalkylmonocarboxylic acid esters according to Claim 1, characterised in that they correspond to the formula

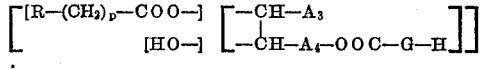

wherein

R is perfluoroalkyl with 4 to 14 carbon atoms,

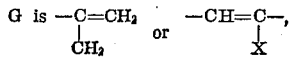

X is hydrogen or methyl, $A_3$ denotes a hydrogen atom or an alkyl radical with 1 to 8 carbon atoms, $A_4$ denotes an alkylene radical with 1 to 8 carbon atoms, and $p$ is 1 to 10.

6. Perfluoroalkylalkylmonocarboxylic acid esters according to Claim 1 characterised in that they correspond to the formula

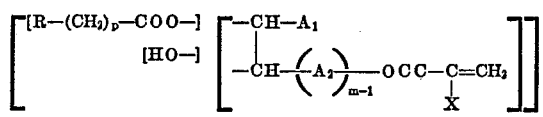

wherein

R is perfluoroalkyl with 4 to 14 carbon atoms,
$A_1$ is an alkyl radical with 1 to 8 carbon atoms,
$A_2$ is —(CH$_2$)—,
X is hydrogen or methyl, and
m is 1 or 2.

7. Perfluoroalkylalkylmonocarboxylic acid esters according to Claim 5, characterised in that they correspond to the formula

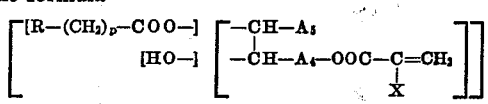

wherein R, $A_4$, X and p have the meaning indicated in Claim 5, and $A_5$ represents a hydrogen atom or a methyl or ethyl group.

8. Perfluoroalkylalkylmonocarboxylic acid esters according to Claim 2, characterised in that they correspond to the formula

wherein R and p have the meaning indicated in Claim 2.

9. Perfluoroalkylalkylmonocarboxylic acid esters according to Claim 1, characterised in that they contain a perfluoroalkyl radical with 5 to 11 carbon atoms.

10. Perfluoroalkylalkylmonocarboxylic acid esters according to Claim 1, characterised in that they contain a perfluoroalkyl radical with 7 to 9 carbon atoms.

11. Perfluoroalkylalkylmonocarboxylic acid esters according to Claim 10, of the formula

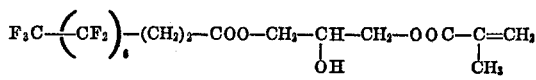

or

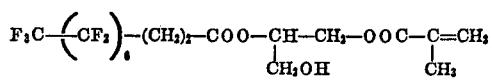

References Cited

UNITED STATES PATENTS

| | | | |
|---|---|---|---|
| 3,067,222 | 12/1962 | Anderson | 260—410.6 |
| 3,340,295 | 9/1967 | Wheeler et al. | 260—486 |
| 3,485,732 | 12/1969 | D'Alelio | 204—159.15 |
| 3,517,065 | 6/1970 | Fielding | 260—585.5 |
| 3,470,258 | 9/1969 | Tesoro | 260—615 |
| 3,632,571 | 1/1972 | Ray-Chaudhuri | 260—239 E |

FOREIGN PATENTS

| | | |
|---|---|---|
| 1,096,392 | 12/1967 | Great Britain. |
| 1,157,320 | 7/1969 | Great Britain. |
| 1,123,379 | 8/1968 | Great Britain. |
| 1,172,082 | 11/1969 | Great Britain. |
| 1,438,617 | 4/1966 | France. |
| 1,535,485 | 7/1968 | France. |
| 1,280,208 | 10/1968 | Germany. |
| 1,518,737 | 11/1969 | Germany. |

LEWIS GOTTS, Primary Examiner

D. G. RIVERS, Assistant Examiner

U.S. Cl. X.R.

260—404, 404.8, 468 J, 482 C, 485 F, 486 H, 487; 117—121, 124, 127, 138.8 F, 138.8 M, 138.8 UA, 141, 143 R, 144, 154